E. O. CLARK.
HEADLIGHT TURNING MEANS.
APPLICATION FILED NOV. 17, 1913.
1,110,536.
Patented Sept. 15, 1914.
2 SHEETS—SHEET 1.
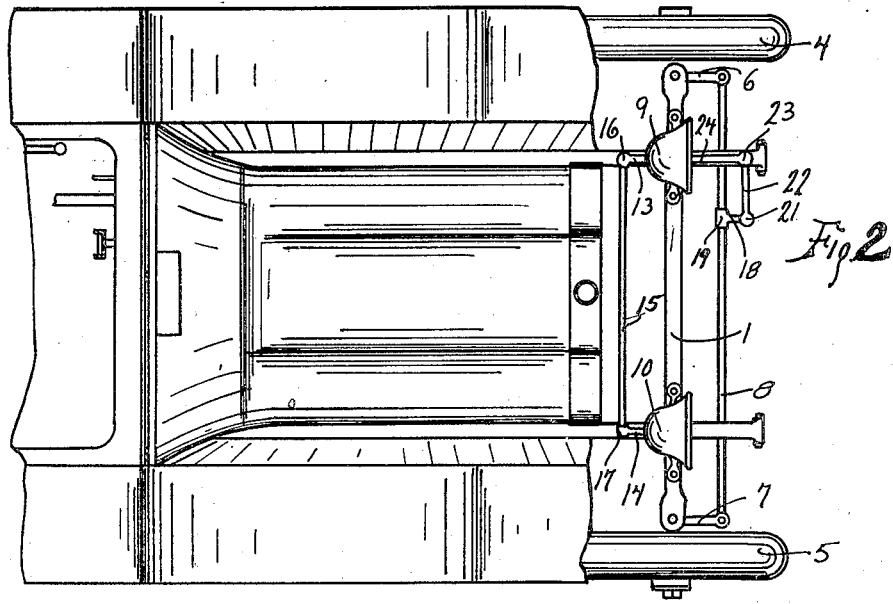
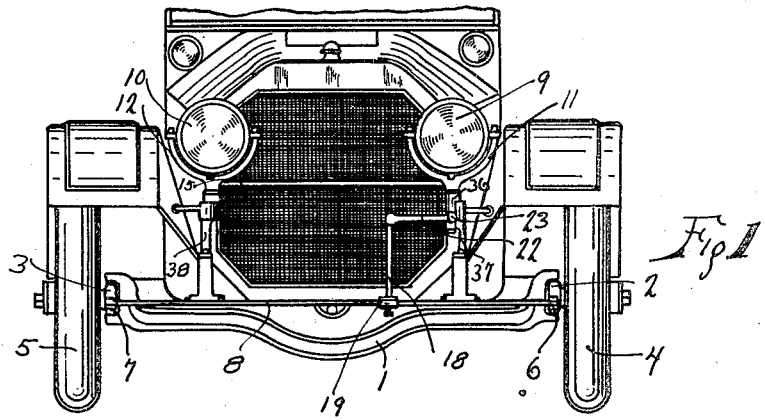
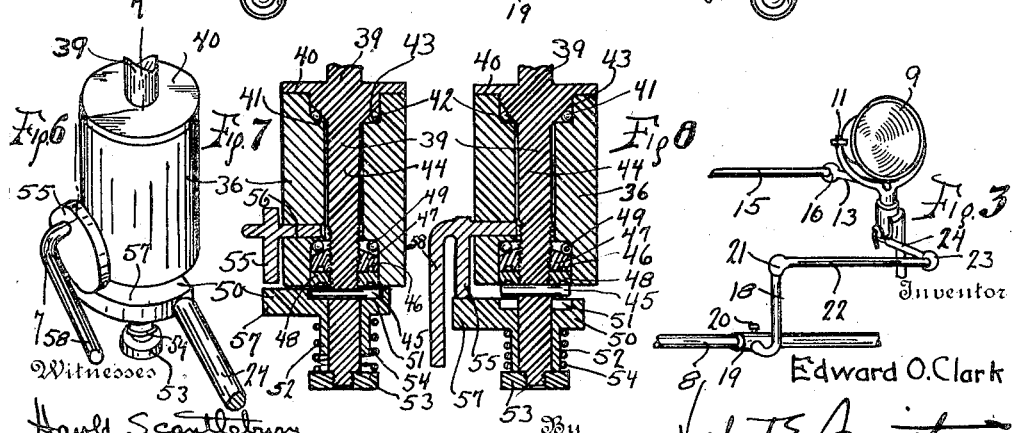
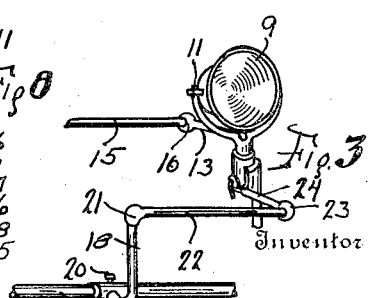
Witnesses
Harold Scantlebury
Edna Broyles
Inventor
Edward O. Clark
By Herbert E. Smith
Attorney E. O. CLARK.
HEADLIGHT TURNING MEANS.
APPLICATION FILED NOV. 17, 1913.
1,110,536.
Patented Sept. 15, 1914.
2 SHEETS—SHEET 2.
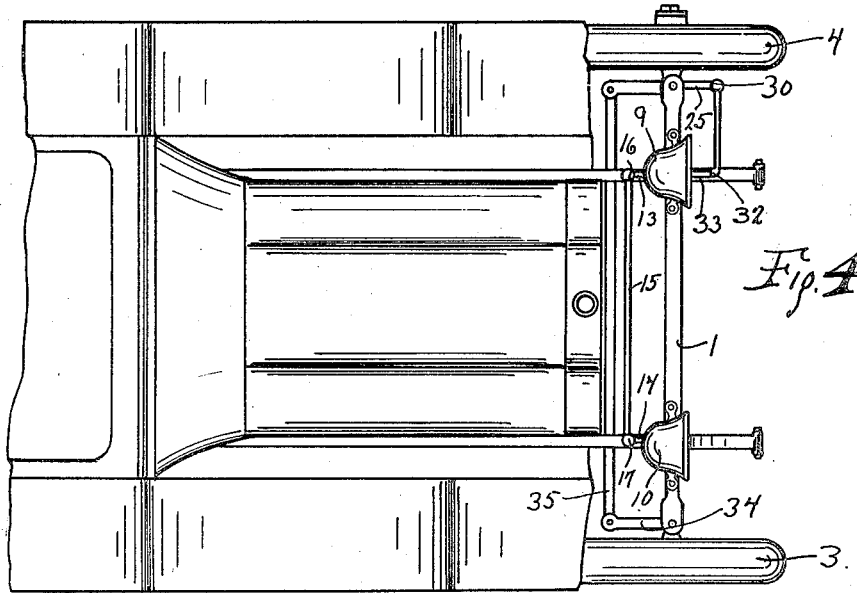
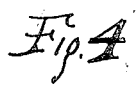
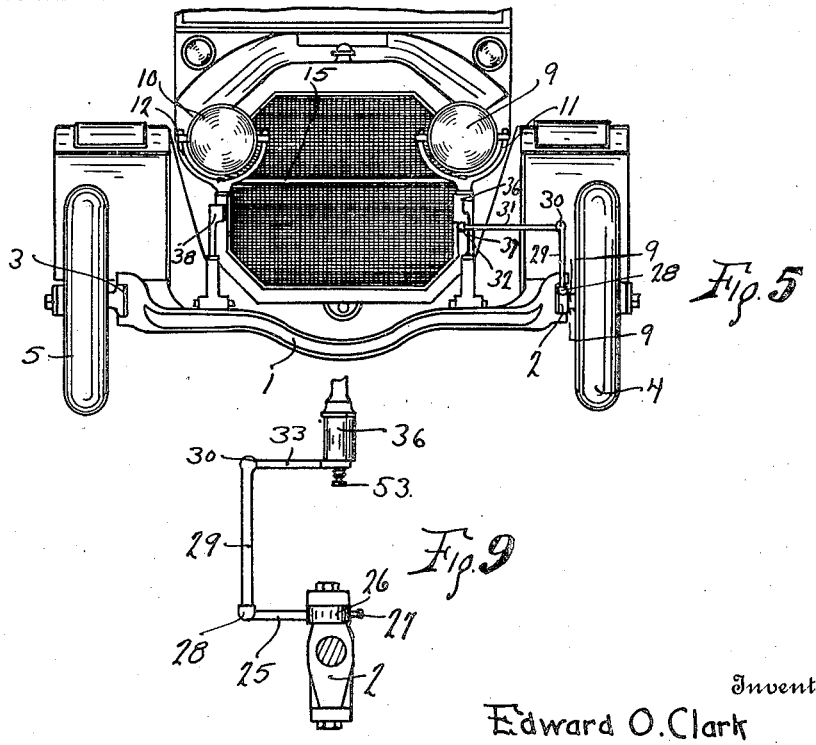
Witnesses
Harold Scantlebury
Edna Broyles
Inventor
Edward O. Clark
By Herbert E. Smith
Attorney

UNITED STATES PATENT OFFICE.

EDWARD O. CLARK, OF SPOKANE, WASHINGTON, ASSIGNOR OF ONE-THIRD TO EDWARD A. MOYE, OF SPOKANE, WASHINGTON.

HEADLIGHT-TURNING MEANS.

1,110,536.  Specification of Letters Patent.  Patented Sept. 15, 1914.

Application filed November 17, 1913. Serial No. 801,535.

*To all whom it may concern:*

Be it known that I, EDWARD O. CLARK, a citizen of the United States, residing at Spokane, in the county of Spokane and State of Washington, have invented new and useful Improvements in Headlight - Turning Means, of which the following is a specification.

This invention relates to improvements in head light turning means, which is especially designed for use in connection with automobiles to turn the head lights synchronously with turning movement imparted to the steering wheels.

One of the special objects of this invention is to equip a device of this character with means whereby it may be readily thrown out of operation during day light and whereby it may be conveniently and readily thrown into operation for use at night.

Other features of novelty will be more fully described in connection with the accompanying drawings, and will be more particularly pointed out in and by the appended claim.

In the drawings:—Figure 1 is a view in front elevation, showing the device of my invention in connection with a steering gear in which an upper rod is forwardly disposed with respect to the front axle. Fig. 2 is a plan view thereof. Fig. 3 is a perspective view of one of the lamps, showing the operative connection with the knuckle rod as illustrated in Figs. 1 and 2. Fig. 4 is a plan view of an automobile showing the knuckle rod disposed rearwardly of the front axle and illustrating the application of the device of my invention thereto. Fig. 5 is a front elevation thereof. Fig. 6 is a detached perspective view of my improved throw-out device. Fig. 7 is a sectional view on line 7—7 of Fig. 6, showing the throw-out device in a connecting or operative adjustment.
justment. Fig. 8 is a view similar to Fig. 7, showing the device in a disconnecting adjustment. Fig. 9 is a sectional view on line 9—9 of Fig. 5.

Like characters of reference designate similar parts throughout the different figures of the drawings.

In Figs. 1 and 2, 1 designates a front axle and 2 and 3 designate the knuckles upon which the axle studs for the steering wheels 4 and 5, are carried. The knuckles 2 and 3 are provided with knuckle arms 6 and 7, respectively, with which a knuckle rod 8 is pivotally connected. The knuckle rod 8 is connected for operation by the steering wheel, in the usual manner, such connection not being herein shown. Lamps 9 and 10 are mounted in forks 11 and 12, respectively, which are revolubly mounted in supports embodying the device of my invention and which will hereinafter be more fully described. Fork 11 is provided with a fork arm 13 and fork 12 is provided with a fork arm 14, which fork arms are connected by a rod 15 to cause the forks to be shifted in unison. Arm 13 is preferably connected with fork rod 15 by a ball and socket joint 16, and a like joint 17, connects fork arm 14 with said rod 15.

Movement is imparted to fork 11 by an operating arm 18, which is preferably adjustably mounted on the knuckle rod 8 by a sleeve 19 and a set screw 20. Arm 18 is connected by a ball and socket joint 21 with a connecting rod 22 and the latter is connected by a ball and socket joint 23 with a rod 24, which operates the forks in unison through the connections hereinbefore described, and which act through the device of my invention to either shift the lamps or permit the same to remain in a given position, dependent upon the adjustment of the device of my invention. The form shown in Figs. 1 and 2 is especially adapted and is generally used where the fenders or guards extend over the vertical axes of the steering wheels.

I will next describe the form shown in Figs. 4 and 5, which is more especially designed in cases where the fenders or guards do not extend over the wheel centers. In this form, I connect an operating arm 25 to knuckle 2, by means of a collar 26 and a set screw 27. Arm 25 is connected by a rigid connection 28 to a vertical rod 29 which is connected by a ball and socket joint 30 with a rod 31. Rod 31 is connected by a ball and socket joint 32 with an arm 33, which serves to shift the forks through the device of my invention. In this form, knuckle arms 34 are connected by a knuckle rod 35, and the lamps are not shifted, through the device of my invention, by direct connection thereof with the knuckle rod, as in the form shown in Figs. 1 and 2. The connections for causing the lamps to shift in unison are the same as in Figs. 1 and 2.

I will next refer to the specific form shown of the device of my invention and attention may be directed more particularly to Figs. 6, 7 and 8. A sleeve 36 may be fixed in any desired manner to an upright 37, which may be mounted on the front axle, and the sleeve 36 is held against rotation or longitudinal movement thereby. Only one of the lamps need be equipped with the device of my invention, and the other lamp may be supported by an upright 38. Fork 11 may be especially provided with or attached to a shank 39, which extends through sleeve 36 in a manner to be rotated with respect thereto. Said shank 39 is provided with a supporting flange 40, which rests upon sleeve 36, and the latter is provided with a ball race 41 in which anti-friction balls 42 are disposed in a manner to engage a conical anti-friction surface 43 of the shank 39. The shank 39 is reduced at 44 and extends downwardly through the sleeve at the lower end of which a locking pin 45 is carried by said shank. The sleeve 36 is bored out, as at 46, and an anti-friction ball nut 47, with a suitable lock nut 48 are turned on to a threaded portion of the shank 44. The bored out portion 46 forms a ball race between which and the nut 47 I dispose a plurality of anti-friction balls 49. Thus the shank 39 is rotatively held by the sleeve 36 against longitudinal movement therein.

On the lower end of the shank 39, I slidably mount a socketed locking member 50 for coaction with the locking pin or member 45. The socketed locking member 50 is provided with a recess 51, which is shaped to take or receive the pin 45 when the parts are in the adjustment shown in Fig. 7, so as to lock the shank 39 against independent rotative movement with respect to the locking member 50. In the adjustment shown in Fig. 8, the locking member 50 is free for adjustment or movement independently of the shank 39. The locking member 50 is provided with a sleeve 52, which is slidable on the shank 39 and which is limited in an unlocking movement by a stop or nut 53 on shank 39. A spring 54 normally urges the locking member 50 into the locking position shown in Fig. 7, and is interposed between the stop 53 and the locking member 50. The locking member 50 is attached to the arm 24, or the arm 33, as the case may be, for operation from the connections to the knuckle rod 8 or to the knuckle 2, in the manner hereinbefore described, and if the device of my invention is in the adjustment shown in Fig. 7, it will transmit movement to the fork of lamp 9 and therefrom through parts 13, 14 and 15 to lamp 10.

I will next describe the manner in which the locking member 50 is shifted, against the action of spring 54, out of locking relation with locking member 45. A shift device is provided, which is shown in the form of an eccentric or cam 55, which is provided with a spindle 56, eccentrically disposed thereon and rotatable in the sleeve 36 with a relatively tight fit so as to resist accidental movement thereof as a result of vibration to which the running gear of an automobile is subjected. The cam 55 is arranged to engage an extension 57 on the locking member 50, which extension projects outwardly from the periphery of the sleeve 36 for this purpose. When the shifting member is in the position shown in Fig. 7, the spring 54 will act in the manner hereinbefore described to shift locking member 50 into engagement with locking member 45. However, I provide a handle 58 for shifting the cam 55 into the position shown in Fig. 8, so as to move the locking member 50 out of locking engagement with the locking member 40, as shown in Fig. 8. When disconnection is effected, the locking member is free to oscillate under the action of steering movement imparted when the front wheels are shifted, but no movement will be imparted to the shank 39. This adjustment is desirable during the day so that the lamps will not be shifted. Should there be any tendency of frictional engagement between the parts 57 and 55 to release the latter from the position shown in Fig. 8, the upper face of 57 can be lubricated. I also consider it within the province of my invention to provide a set screw for locking 55 in the position shown in Fig. 8, if occasion should require.

While I have herein shown and described one specific form of my invention, I do not wish to be limited thereto except for such limitation as the claim may import.

It will be understood that if it is desired to turn the head lights synchronously with the turning movement imparted to the steering wheels without providing means for the throwing of the device out of operation, the locking mechanism inclosed by sleeve 36 may be omitted and both lamp forks, 11 and 12, supported by uprights similar to 38.

I claim:—

In a head light turning means for automobiles, connected head lights, a sleeve fixed to the running gear with its axis upright, a fork for one of said lights having a shank extending through and revolubly mounted in said sleeve, a locking member rotatably mounted on said shank, wheel steering means connected with said member to shift the lights, said shank having a locking pin and said member being notched to engage said pin and lock said shank and member against independent rotation with respect to each other, a spring normally acting to shift said member into locking engagement with said shank and said member having a cam engaging extension projecting horizontally and radially outwardly from the periphery of the sleeve, and a cam having a spindle projecting eccentrically therefrom and journaled in said fixed sleeve to rotate about an axis at right angles to the axis of said sleeve to engage the periphery of said cam against said extension to disengage said member from said shank, and said cam being provided with a handle for operation thereof, substantially as described.

In testimony that I claim the foregoing as my own, I hereby affix my signature in the presence of two subscribing witnesses.

EDWARD O. CLARK.

Witnesses:
 HAROLD SOUTHERLAND,
 EDNA BROYLES.